US008841601B2

(12) United States Patent
Lee

(10) Patent No.: US 8,841,601 B2
(45) Date of Patent: Sep. 23, 2014

(54) NON-LINEAR CALIBRATION OF A MICROBOLOMETER INCLUDED IN AN INFRARED IMAGING SYSTEM

(75) Inventor: Jeffrey H Lee, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 320 days.

(21) Appl. No.: 13/359,613

(22) Filed: Jan. 27, 2012

(65) Prior Publication Data
US 2013/0193326 A1    Aug. 1, 2013

(51) Int. Cl.
| | |
|---|---|
| *G01D 18/00* | (2006.01) |
| *G12B 13/00* | (2006.01) |
| *G01J 5/22* | (2006.01) |
| *H04N 5/33* | (2006.01) |
| *G01J 5/06* | (2006.01) |
| *G01J 5/00* | (2006.01) |

(52) U.S. Cl.
CPC ... *G01J 5/22* (2013.01); *H04N 5/33* (2013.01); *G01J 2005/068* (2013.01); *G01J 2005/0048* (2013.01)
USPC ...... 250/252.1; 250/338.4; 250/340

(58) Field of Classification Search
CPC ...................................... H04N 5/33
USPC ................... 250/340, 338.4, 252.1
See application file for complete search history.

(56) References Cited

U.S. PATENT DOCUMENTS

| | | | | |
|---|---|---|---|---|
| 4,844,623 | A * | 7/1989 | Wada | 374/171 |
| 6,267,501 | B1 * | 7/2001 | Wand et al. | 374/124 |
| 2002/0025018 | A1 * | 2/2002 | Takagi et al. | 378/8 |
| 2002/0125430 | A1 * | 9/2002 | Wood | 250/338.1 |
| 2007/0221850 | A1 * | 9/2007 | Panin et al. | 250/363.04 |
| 2010/0288915 | A1 * | 11/2010 | Endo | 250/252.1 |

\* cited by examiner

*Primary Examiner* — David Porta
*Assistant Examiner* — Abra Fein
(74) *Attorney, Agent, or Firm* — Maine Cernota & Rardin; Douglas P. Burum

(57) ABSTRACT

An apparatus and method for reducing nonlinearity artifacts in an IR imaging system applies a non-linear correcting function to signals received from a microbolometer. The non-linear correcting function can be a second-order polynomial, a third-order polynomial, some other formula, or a table from which corrections can be interpolated. In embodiments, the correcting function is automatically adjusted according to an ambient temperature measurement, to which a non-linear correction can be applied, either in a separate step or as an adjustment to the correcting function applied to the microbolometer signals.

22 Claims, 5 Drawing Sheets

NON-LINEAR CALIBRATION OF A MICROBOLOMETER INCLUDED IN AN INFRARED IMAGING SYSTEM

FIELD OF THE INVENTION

The invention relates to infra-red imaging equipment, and more particularly, to image correction methods for microbolometers in infrared imaging systems.

BACKGROUND OF THE INVENTION

Infra-red imaging systems are important tools for military, law enforcement, fire fighting, search-and-rescue, and other applications where real-time vision is needed at night, or under any other low-light conditions. Infrared imaging systems typically focus infrared radiation naturally emitted by a scene onto an infra-red sensor array, which is most commonly of a type known as a "microbolometer." A microbolometer is an uncooled thermal detector that includes an array of sensors, each of which provides a pixel for the resulting image. The focused infrared image, typically with wavelengths between 7.5 and 14 μm, strikes the sensors, heating them and thereby changing their electrical resistance according to the IR intensity at each sensor. These resistance changes are measured and processed into temperature differences, which are then used to create an image.

It is advantageous for the real-time images produced by IR imaging systems to be as realistic and undistorted as possible, so that the user can experience a believable simulation of vision as it would appear under normal daytime lighting conditions. This allows the user to effortlessly interpret the images obtained from the IR system, and to give his or her full attention to other tasks without needing to consciously interpret the images being viewed. Accurate adjustment and correction of the microbolometer signals is therefore highly desirable.

Typically, gain and offset corrections are applied to the signals obtained from a microbolometer before the final images are formed. These corrections serve to adjust the contrast and brightness respectfully of the images. The brightness and contrast adjustments can be pre-encoded into the apparatus and/or made available for user adjustment. Since both the gain and offset of a microbolometer are typically dependent on the ambient temperature, many IR imagers include an ambient temperature sensor, so that the measured ambient temperature can be used to automatically apply gain and offset corrections, possibly according to temperature compensation factors provided by the manufacturer of the microbolometer.

The application of a gain and offset correction to the signals from the microbolometer can be expressed mathematically as:

$$y = mx + b \qquad (1)$$

where x is the signal from the microbolometer, y is the image pixel intensity, m is the gain correction, and b is the offset correction. Clearly, this approach assumes a linear response of the microbolometer to IR intensity. In addition, an accurate measurement of the ambient temperature is assumed, so that the factors m and b can be accurately adjusted to take the ambient temperature into account.

However, as is illustrated in FIG. 1, if the response 100 of the microbolometer is not linear, then application of the linear correction 102 of equation 1 can provide only an approximate correction, even when the factors m and b are optimally selected. Errors in temperature measurement, possibly due to a non-linear temperature sensor, will make the result even worse. As a result, non-linearity artifacts can arise in the images produced by infrared imaging systems, and these artifacts can distract a user, impair the user's vision, and even endanger the safety of the user if the apparatus is being used in a dangerous situation. This can be especially problematic when the user is viewing a part of the scene that is especially low or high in infra-red intensity, and is thus near the dynamic range limit of the imaging system.

What is needed, therefore, is an apparatus and method for reducing nonlinearity artifacts in IR imaging systems by accurate temperature measurement and accurate correction of the signals obtained from a microbolometer.

SUMMARY OF THE INVENTION

An apparatus and method for reducing nonlinearity artifacts in an IR imaging system applies a non-linear correction to signals received from a microbolometer included in the IR imaging system. In embodiments, the non-linear correction is a second-order polynomial correction that can be expressed as:

$$y = ax^2 + bx + c \qquad (2)$$

where x is the intensity of the signal from the bolometer, y is the intensity of the corresponding image pixel, b is a gain correction, c is an offset correction, and a is a second-order non-linearity correction.

In other embodiments, a different non-linear correction is used, such as a third-order polynomial, or a non-formulaic correction derived from a table of calibration measurements. In various embodiments, the non-linear correction is applied by calculation according to a formula such as equation 2, or by looking up values in a stored table and interpolating between them to obtain an appropriate correction.

In some embodiments, the non-linear correction curve is adjusted according to an ambient temperature obtained from a temperature sensor. In some of these embodiments, the ambient temperature measurement is corrected for non-linearity, either as a separate step or by including the sensor non-linearity in the correction applied to the microbolometer signals. Correction of the temperature measurements can include application of a second order polynomial, application of a formula that is not a second order polynomial, or interpolation of values in a table.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
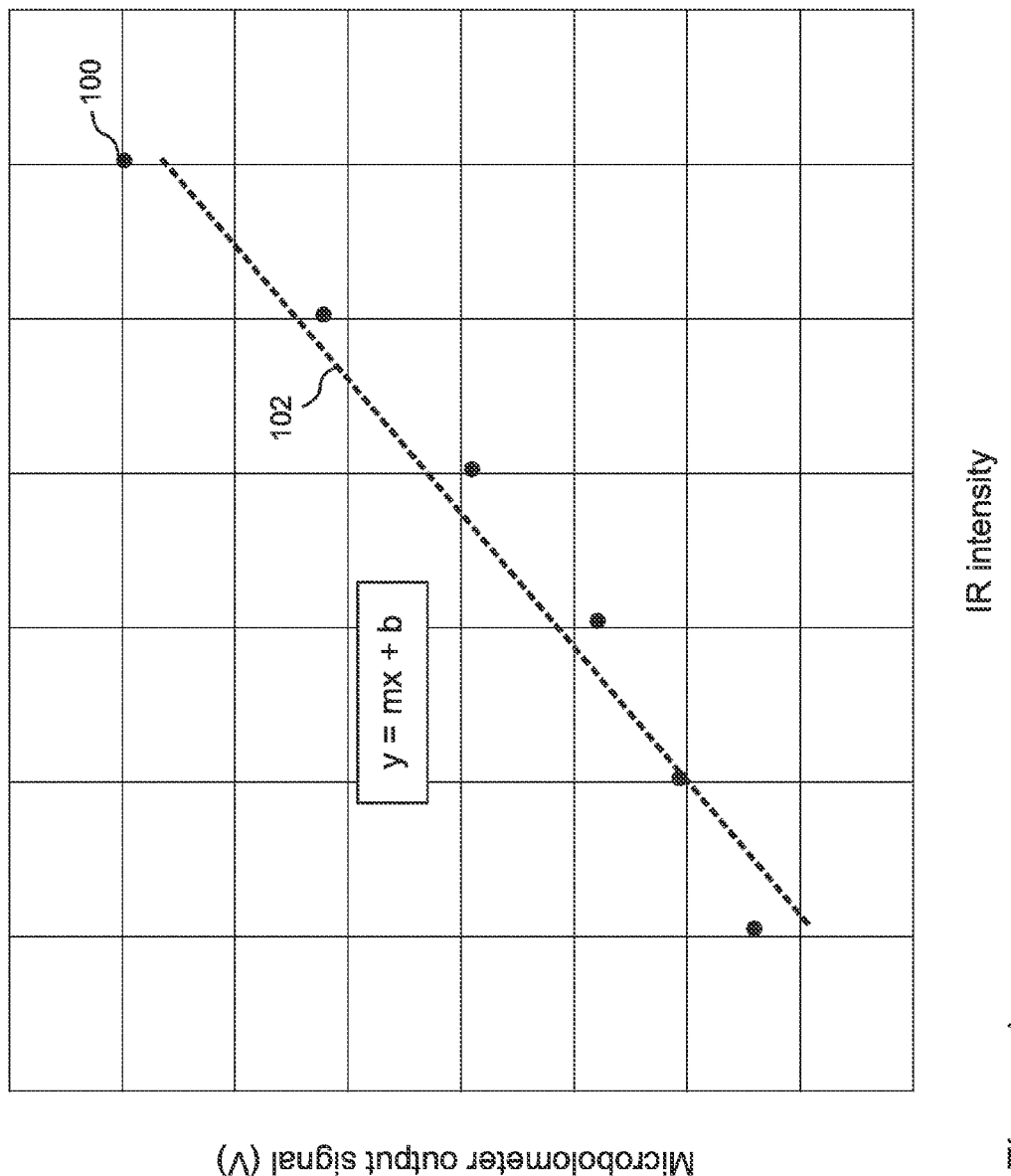
FIG. 1 is a graph comparing a brightness and contrast correction of the prior art to typical microbolometer response data.
Figure 2:
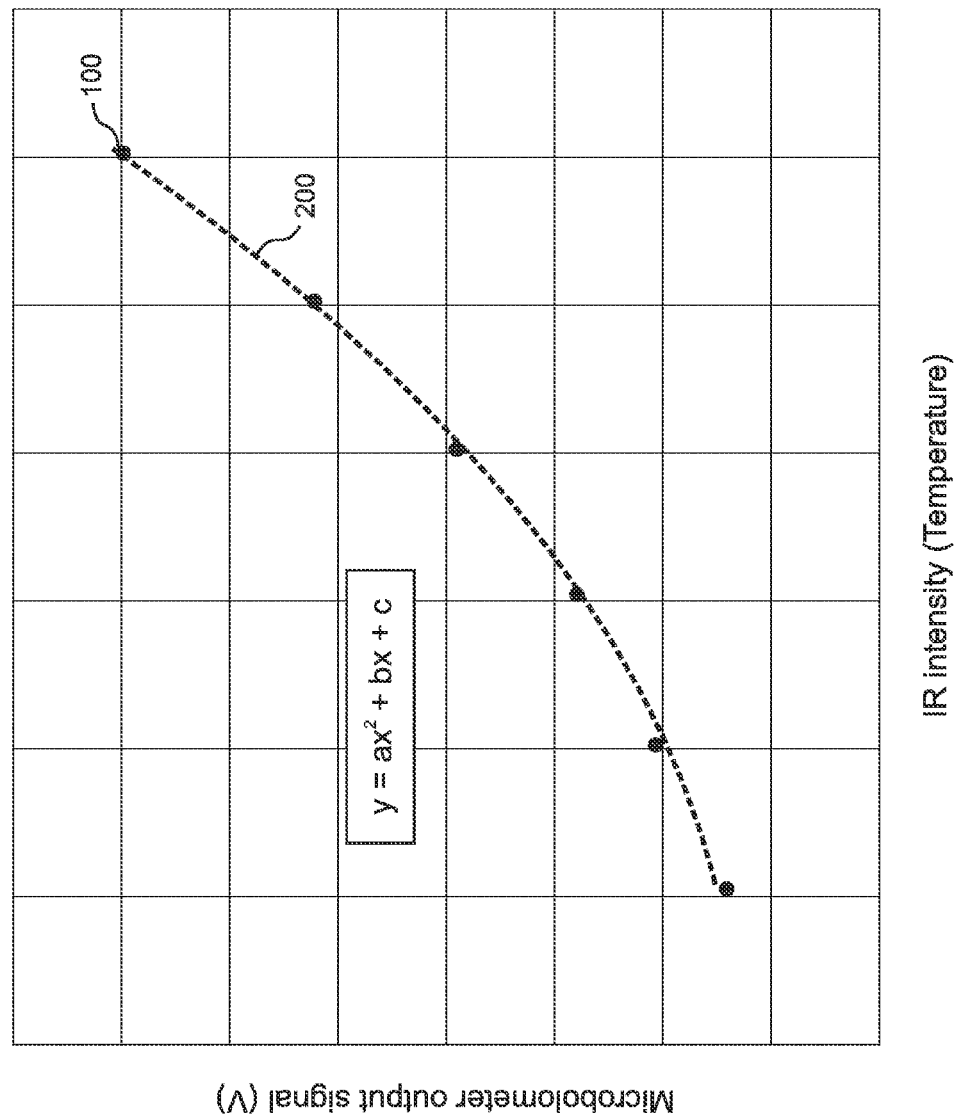
FIG. 2 is a graph comparing a second order polynomial correction function from an embodiment of the invention to the microbolometer response data of FIG. 1.

The present invention is an apparatus and method for reducing nonlinearity artifacts in an IR imaging system by applying a non-linear correction to the signals obtained from a microbolometer included in the IR imaging system. With reference to FIG. 2, in embodiments, the non-linear correction is a second-order polynomial correction 200 that can be expressed by Equation 2 above, where x is the intensity of the signal from the bolometer, y is the intensity of the corresponding image pixel, b is a gain correction, c is an offset correction, and a is a second-order non-linearity correction. A comparison of FIG. 2 with FIG. 1 clearly shows the improved correction of the signals 100 obtained from the microbolometer when a non-linear correction 200 is applied. In other embodiments, a different non-linear correction is used, such as a third-order polynomial.

Figure 3:
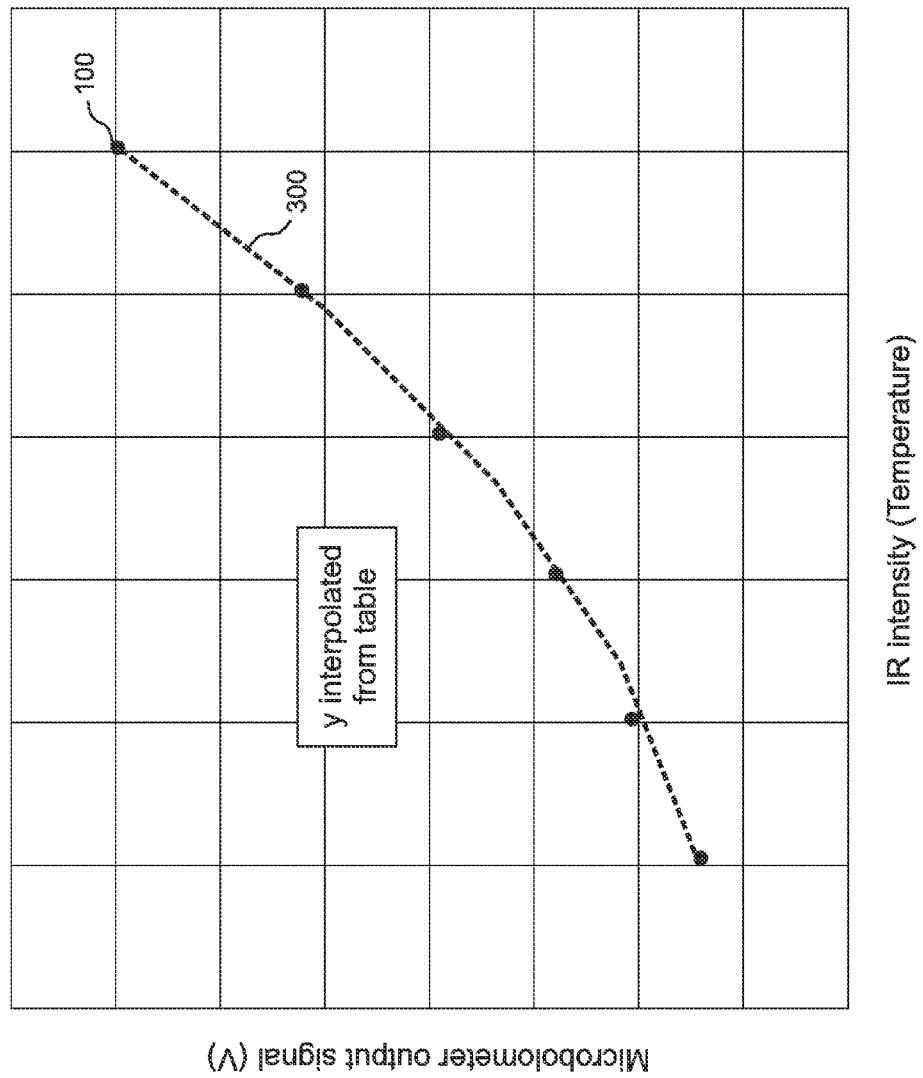
FIG. 3 is a graph comparing an interpolated nonlinear correction curve obtained in an embodiment of the invention from values stored in a table to the microbolometer response data of FIG. 1.

In embodiments that use a formulaic non-linear correction such as the one shown in FIG. 2, the IR imaging system must include a processor of sufficient speed to calculate the corrections in real time. In other embodiments, a non-formulaic correction is pre-calculated or derived from calibration measurements and stored in the apparatus as a table. Corrections are then determined by interpolating the data stored in the table. This approach requires more memory capacity in the IR imaging system as compared to the formulaic approach, but typically requires less processing speed. A typical result 300 is shown in FIG. 3, where the table is indicated to contain an unrealistically small number of points so that the interpolation between the points can be discerned.

Figure 4:
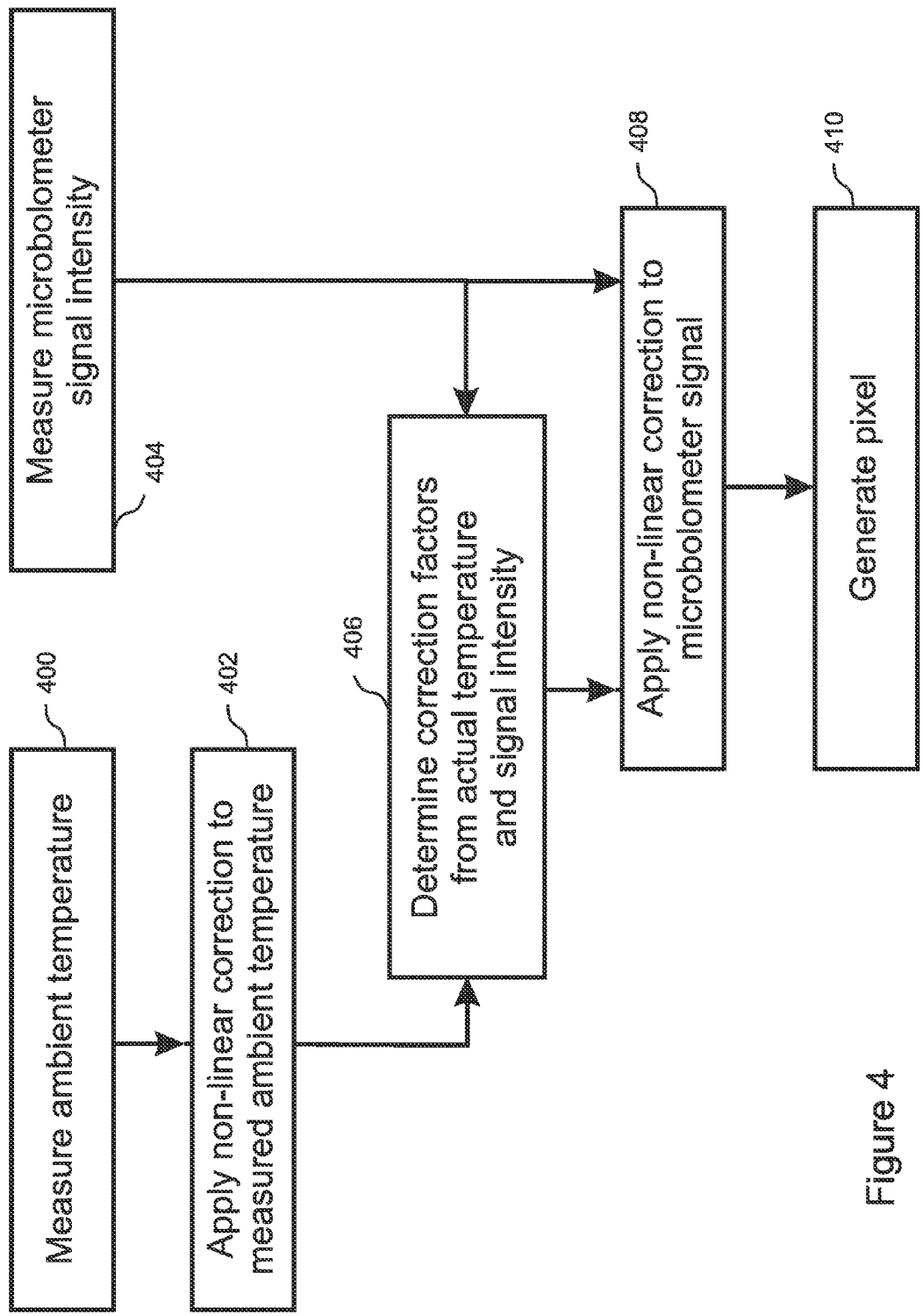
FIG. 4 is a flow diagram illustrating separate correction of a measured ambient temperature before determination of the microbolometer correction factors in an embodiment of the invention.

In some embodiments, the non-linear correction curve is automatically adjusted according to an ambient temperature measurement obtained from a sensor. With reference to FIG. 4, in some of these embodiments the ambient temperature measurement 400 is separately corrected for non-linearity 402, and then the nonlinear correction factor for the microbolometer output is determined 406 according to the intensity value obtained from the microbolometer 404 and the corrected, actual temperature 402. The correction factor is then applied 408 to the microbolometer output and the result is converted into a pixel in the IR image. In these embodiments, separate nonlinear formulae and/or separate tables are used for correcting the measured temperature and for determining the correction factor for the microbolometer output. This approach is appropriate, for example, when a predetermined or precalibrated nonlinear correction factor, e.g. supplied by the manufacturer, is applied to the measured ambient temperature.

Figure 5:
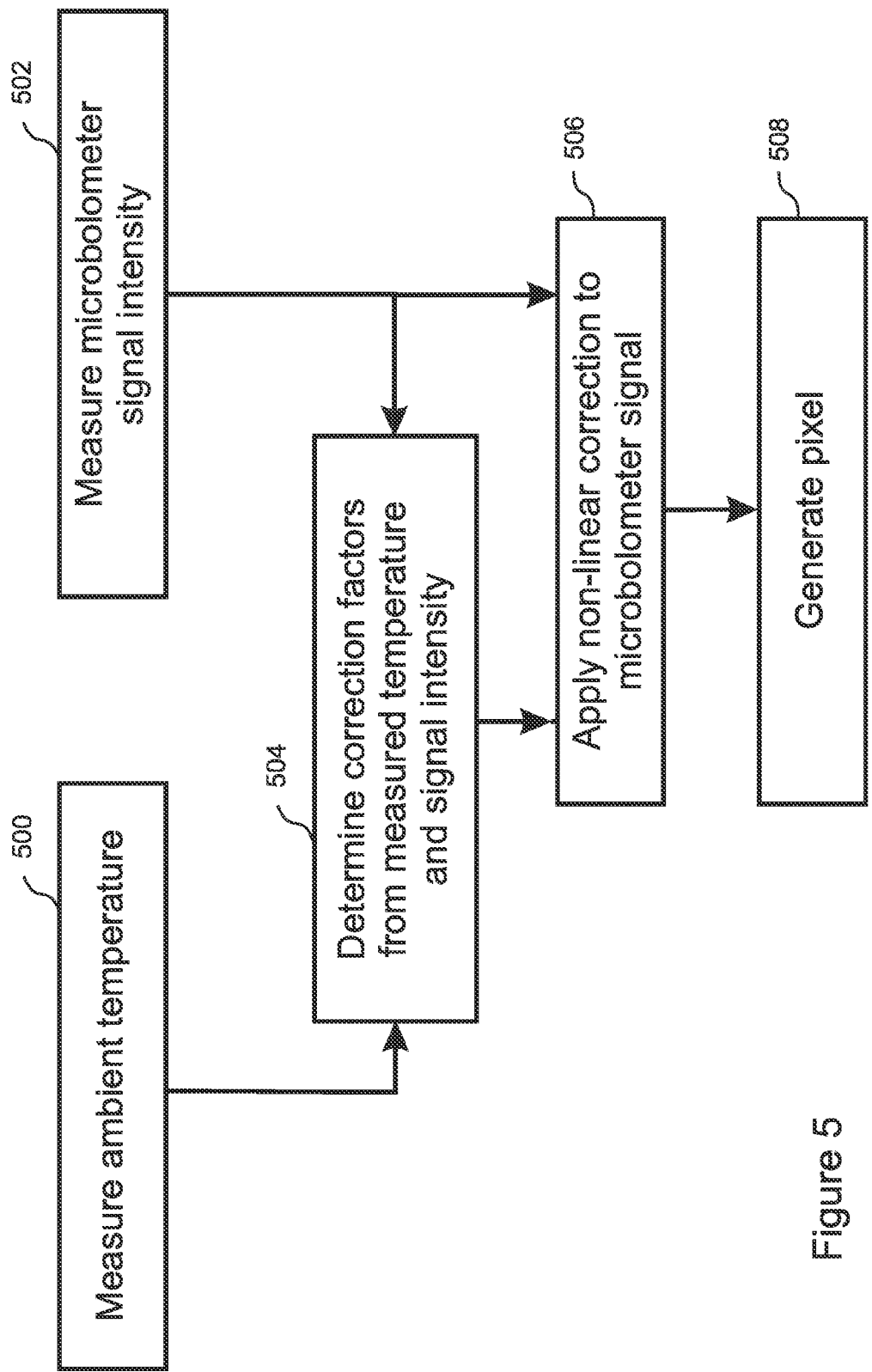
FIG. 5 is a flow diagram illustrating determination of the microbolometer correction factors using an uncorrected measurement of ambient temperature in an embodiment of the invention

With reference to FIG. 5, in similar embodiments the nonlinear correction for the measured ambient temperature is combined with the nonlinear correction for the microbolometer output into a single formula or table that is dependent on both the temperature measurement and the microbolometer output intensity. In these embodiments, the ambient temperature is measured 500 and the microbolometer output is determined 502. The correction factor is then determined from the measured temperature and the microbolometer output 504, and then the correction factor is applied to the microbolometer output 506, after which the corrected microbolometer output is converted to a pixel 508.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for correcting an output of a microbolometer included in an infrared imaging system, the method comprising:
    determining a correcting function, the correcting function being applicable to output signals received from a plurality of sensors included in the microbolometer, the correcting function having a nonlinear dependence on the amplitudes of the output signals;
    receiving a plurality of output signals from the plurality of sensors included in the microbolometer; and
    for each of the received output signals, producing a corrected signal by applying the correcting function to the output signal, the corrected signals having amplitudes that are uniformly and linearly related to intensities of infrared radiation impinging on the corresponding sensors in the microbolometer.

2. The method of claim 1, wherein the correcting function is a polynomial formula.

3. The method of claim 2, wherein the polynomial is a second order polynomial.

4. The method of claim 3, wherein determining the correcting function includes measuring a response of each of the sensors to at least three distinct infrared radiation intensities.

5. The method of claim 1, wherein the correcting function is a collection of stored correction parameters.

6. The method of claim 5, wherein applying the correcting function includes retrieving at least two correction parameters from the collection of stored correction parameters, and interpolating at least one applicable correction parameter from the retrieved correction parameters.

7. The method of claim 1, wherein the correcting function is dependent on an ambient temperature.

8. The method of claim 7, wherein the correcting function is dependent on an actual ambient temperature, and the method further includes receiving a measured ambient temperature and determining the actual ambient temperature by applying a nonlinear temperature correcting function to the measured ambient temperature.

9. The method of claim 8, wherein the nonlinear temperature correcting function is a polynomial formula.

10. The method of claim 9, wherein the polynomial formula is a second order polynomial formula.

11. The method of claim 7, wherein the method further includes receiving a measured ambient temperature and the correcting function is dependent on the measured ambient temperature.

12. An apparatus for correcting an output of a microbolometer included in an infrared imaging system, the apparatus comprising:
    a memory configured for containing data relevant to a correcting function, the correcting function being applicable to output signals received from a plurality of sensors included in the microbolometer, the correcting function having a nonlinear dependence on the amplitudes of the output signals; and a processor cooperative with the memory and configured for receiving the output signals from the plurality of sensors included in the microbolometer, the processor being further configured to produce a corrected signal for each of the output signals by applying the correcting function to the output signal, the corrected signals having amplitudes that are uniformly and linearly related to intensities of infrared radiation impinging on the corresponding sensors in the microbolometer.

13. The apparatus of claim 12, wherein the correcting function is a polynomial formula.

14. The apparatus of claim 13, wherein the polynomial is a second order polynomial.

15. The apparatus of claim 14, wherein determining the correcting function includes measuring a response of each of the sensors to at least three distinct infrared radiation intensities.

16. The apparatus of claim 12, wherein the correcting function is a collection of stored correction parameters.

17. The apparatus of claim 16, wherein the processor is configured to produce the corrected signal by retrieving at least two correction parameters from the collection of stored correction parameters, and interpolating at least one applicable correction parameter from the retrieved correction parameters.

18. The apparatus of claim 12, wherein the correcting function is dependent on an ambient temperature.

19. The apparatus of claim 18, wherein:
the correcting function is dependent on an actual ambient temperature,
the memory is further configured for containing a nonlinear temperature correcting function; and
the processor is further configured to receive a measured ambient temperature and determine the actual ambient temperature by applying the nonlinear temperature correcting function to the measured ambient temperature.

20. The apparatus of claim 19, wherein the nonlinear temperature correcting function is a polynomial formula.

21. The apparatus of claim 20, wherein the polynomial formula is a second order polynomial formula.

22. The apparatus of claim 18, wherein the processor is further configured to receive a measured ambient temperature, and the correcting function is dependent on the measured ambient temperature.

* * * * *